(12) United States Patent
McKenney

(10) Patent No.: US 7,165,870 B2
(45) Date of Patent: Jan. 23, 2007

(54) VIBRATION DAMPENING DEVICE FOR LIGHT FIXTURES

(76) Inventor: Jerry D. McKenney, 49094 Morris Rd., Hammond, LA (US) 70401

( * ) Notice: Subject to any disclaimer, the term of this patent is extended or adjusted under 35 U.S.C. 154(b) by 16 days.

(21) Appl. No.: 11/039,215

(22) Filed: Jan. 19, 2005

(65) Prior Publication Data

US 2006/0158889 A1 Jul. 20, 2006

(51) Int. Cl.
*F21V 15/04* (2006.01)
(52) U.S. Cl. .................... 362/369; 362/390; 362/431; 248/624; 248/603
(58) Field of Classification Search ............... 362/369, 362/390, 368, 370, 431; 248/624, 625, 603
See application file for complete search history.

(56) References Cited

U.S. PATENT DOCUMENTS

| 2,781,443 A | * | 2/1957 | Cargle ........................ 362/485 |
|---|---|---|---|
| 2,966,324 A | | 12/1960 | Heinzen |
| 4,373,696 A | | 2/1983 | Dochterman |
| 4,680,424 A | | 7/1987 | Hawkins |
| 4,870,552 A | * | 9/1989 | Vitta et al. .................. 362/369 |
| 5,067,065 A | * | 11/1991 | Dahlgren .................... 362/369 |
| 5,601,274 A | | 2/1997 | Minor et al. |
| 5,818,650 A | | 10/1998 | Nyhof et al. |
| 5,860,734 A | * | 1/1999 | Rodgers et al. ............. 362/369 |
| 5,964,444 A | | 10/1999 | Guertler |
| 6,070,846 A | | 6/2000 | Shimokobe et al. |
| 6,202,964 B1 | | 3/2001 | Thornhill |
| 6,665,968 B1 | | 12/2003 | Jen |
| 6,685,154 B1 | | 2/2004 | Blyth et al. |
| 2003/0024144 A1 | | 2/2003 | Jen |
| 2004/0139812 A1 | | 7/2004 | Erel et al. |

* cited by examiner

*Primary Examiner*—Thomas M. Sember
(74) *Attorney, Agent, or Firm*—Sieberth & Patty, LLC

(57) ABSTRACT

A device for the dampening of the transfer of vibrations to a light fixture from a structure. The device which connects to a light fixture can connect to a structure at a place where a light fixture would otherwise connect. The dampening component of the device can be configured to dampen structural vibrations of many directional orientations.

10 Claims, 2 Drawing Sheets

US 7,165,870 B2

VIBRATION DAMPENING DEVICE FOR LIGHT FIXTURES

FIELD OF INVENTION

The present invention relates to devices and methods for reducing vibration effects upon lighting fixtures.

BACKGROUND

Known lighting fixtures have experienced premature failures resulting from excessive vibrations received through support structures. This problem drives up fixture maintenance costs, especially when the fixtures are expensive, commercial grade fixtures or are installed in places where access is difficult. Previous attempts have been made to address such vibration issues. See, e.g., U.S. Pat. No. 5,601,274. However, previous developments in the field typically have provided devices which are difficult to manufacture and which themselves can be difficult to maintain.

A need therefore remains for simple yet effective devices and methods for dampening vibration in light fixtures attached to structures which are prone to vibration.

SUMMARY OF INVENTION

The present invention meets this need, amongst others, by providing a device comprising:
(a) a first component which connects to a support structure at a light fixture receiving portion of the support structure,
(b) a second component sized and configured for connection to the light fixture, and
(c) a dampening component which connects the first component to the second component and which dampening component is configured to dampen the transfer of vibration from the support structure to the light fixture.

In another embodiment of the invention, the dampening component is sized and configured to dampen vibration acceleration along a plurality of non-parallel axes.

Yet another embodiment of this invention is a method of dampening vibration comprising:
(a) attaching a first component to a support structure at a light fixture receiving portion of the support structure,
(b) attaching a second component to a light fixture, and
(b) disposing a dampening component between the first component and the second component so that vibration from the support structure is dampened along a plurality of non-parallel axes.

These and other embodiments and features of the present invention will become even more apparent from the following detailed description, the accompanying drawings and the appended claims.

BRIEF DESCRIPTION OF THE DRAWINGS

In each of the above figures, like numerals are used to refer to like parts among the several figures.

DETAILED DESCRIPTION OF THE INVENTION

It will now be appreciated that this device has the desirable feature of dampening the transfer of vibration to a light fixture and attaching at a light fixture receiving portion of the support structure. This feature enables facile retrofitting of existing fixtures which are installed in locations prone to vibration, as well as the adaptation of newly installed fixtures to protect them against future vibration incidents.

Devices of the present invention have the added feature of dampening vibrations along more than one vector or axis of vibration acceleration. This is an advance over the prior art because the freedom of motion of the fixture with respect to the structure allows dampening of structural vibration in many directions with respect to the fixture, enhancing the effectiveness of the device over a larger range of vibrational frequency and amplitude.

In a preferred embodiment of the invention, the dampening device comprises one or more springs, preferably an arrangement of multiple springs. The first component and the second component provide a means for maintaining the configuration of the springs. In the preferred embodiment the first and second components comprise respective metal plates. The springs are configured between the first component and the second component such that the respective axes along which the springs are coiled are substantially parallel to each other and are substantially perpendicular to the imaginary planes occupied by the plates of both the first component and the second component. In this particular embodiment, the springs are attached to the plates at respective spring ends and the springs are sandwiched between the metal plates of the first component and the second component.

The structure to which the first component connects would most typically be structures that are used to support light fixtures, such as light poles and trusses. The first component is typically bolted to the structure but may be welded or attached in another manner. A preferred embodiment of the first component is one that detachably attaches to a light pole by way of bolting, preferably by one or more U-bolts.

The second component is typically attached to a light fixture that is commonly used to light bridges and highways, although other types of lighting fixtures can benefit from the use of the present invention. The first component is attached at a light fixture receiving portion of the support structure. Such receiving portion can be, for example, the free end of a horizontally extending pole or an arcuate support arm.

The dampening device preferably is comprised of at least one spring, more preferably an arrangement of multiple springs. Other types of shock absorbers and cushions (e.g., rubber foam pads) may also serve as the dampening device component of devices of this invention. The first and second components are connected to one another through their respective connections to the dampening device.

Figure 1:
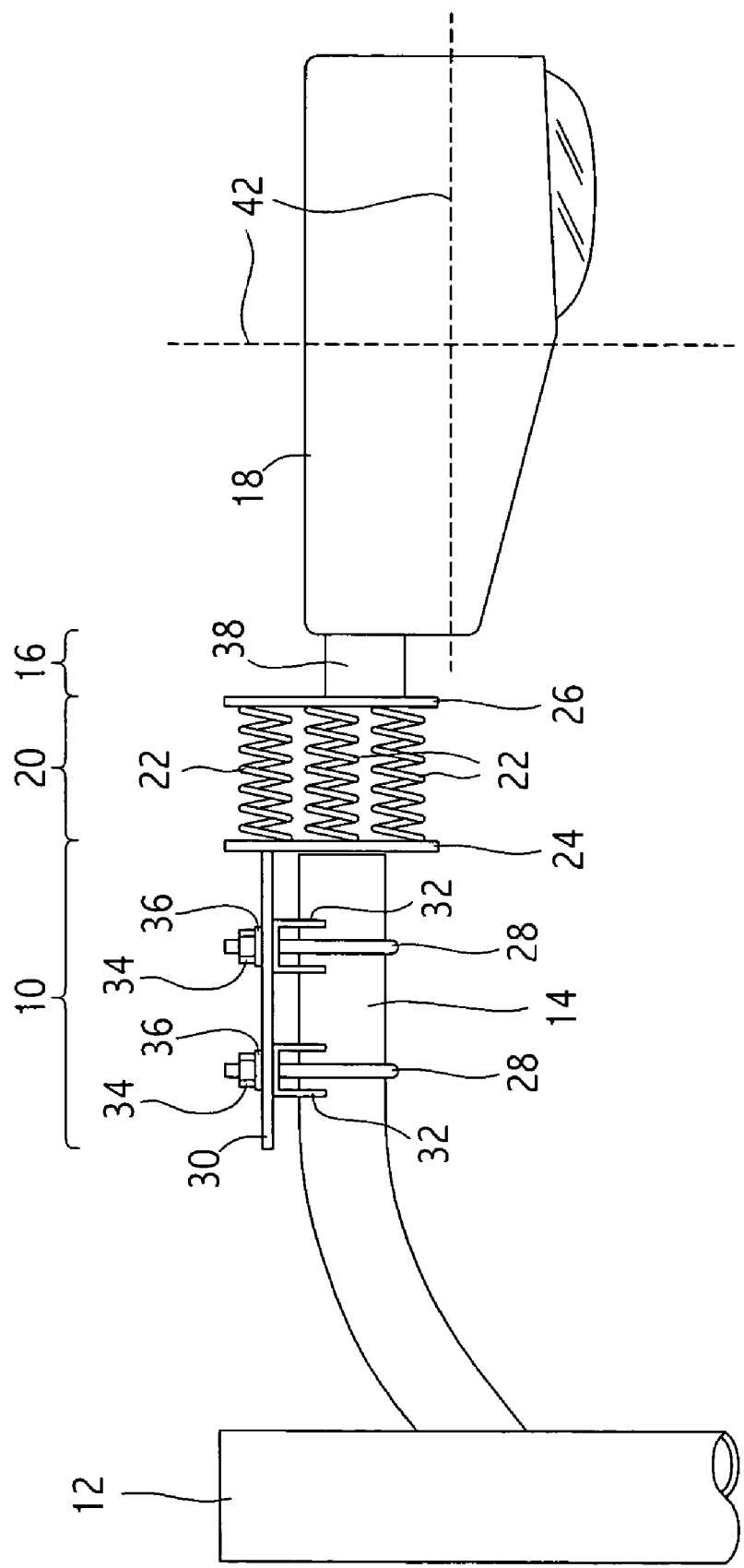
FIG. 1 is a side view of a preferred embodiment of the present invention

Turning now to the drawings, FIG. 1 illustrates a device which is a preferred embodiment of the invention. In this figure there a lighting fixture 18 shown attached to the device of the invention. That device comprises three components, a first component 10, a second component 16, and a dampening component 20. First component 10 is sized and configured for connection to a support structure. In this figure the support structure is a light pole 12. First component 10 is connected by way of a U-bolt to a horizontal arm 14 extending from pole 12. The free end of arm 14 is the light fixture receiving portion of the support structure. The free end of horizontal arm 14 is the place where a light fixture would typically be attached in the absence of the device of this invention.

First component 10 as it is illustrated in FIG. 1 comprises a rectangular metal plate, 24 oriented vertically to which dampening component 20 is attached. The side of plate 24 opposite the side connected to dampening component 20 is set against the end of arm 14. Another metal plate 30 is a rectangular plate oriented horizontally and welded to plate 24 so that plate 30 is perpendicular to plate 24. Plate 30 has holes drilled into the metal allowing the device to be attached to arm 14 by two u-bolts 28. Two brackets 32 are used between arm 14 and plate 30 to ensure secure attachment to arm 14. U-bolts 28, brackets 32, arm 14, and plate 30 are all fastened together with nuts 34 and washers 36.

Second component 16 is sized and configured to receive a light fixture. Second component 16 consists of a rectangular metal plate 26 which is oriented vertically to connect to dampening component 20 and to connect to a device 38 for attaching to light fixture 18, which is a piece of pipe, a pole or a pipe. Device 38 is also comprised within second component 16.

As illustrated, dampening component 20 comprises seven springs 22, each being coiled around substantially parallel imaginary axes, which imaginary axes extend substantially perpendicular to both plate 24 and to plate 26. The springs, 22 are spaced so that anticipated movement of the individual springs 22 does not interfere with the other neighboring springs 22. The ends of each spring 22 are welded respectively to plate 26 and plate 24.

As shown in FIG. 1, fixture 18 can be moved within the limits of the range of motion of the springs 22 in any direction. Examples of individual lines or axes along which fixture 18 or pole 14 can move (e.g., accelerate due to vibration) are identified as non-parallel axes 42, 42. As depicted, non-parallel axes 42,42 are perpendicular to one another. These axes have been sometimes referred to herein as lines of dampening. However, the device of this invention provides a range of motion to the fixture, when attached thereto, such that a large and possibly unlimited number of axes of movement (or lines of dampening) intersecting with fixture 18 and traveling outward from fixture 18 in all directions (not shown) are provided. This range of motion ensures highly effective dampening of vibration transfer from pole 12 and arm 14 to fixture 18 by dissipating forces of vibration acceleration from pole 12 and arm 14 regardless of the axes (or vector) along which the vibration acceleration is taking place.

Figure 2:
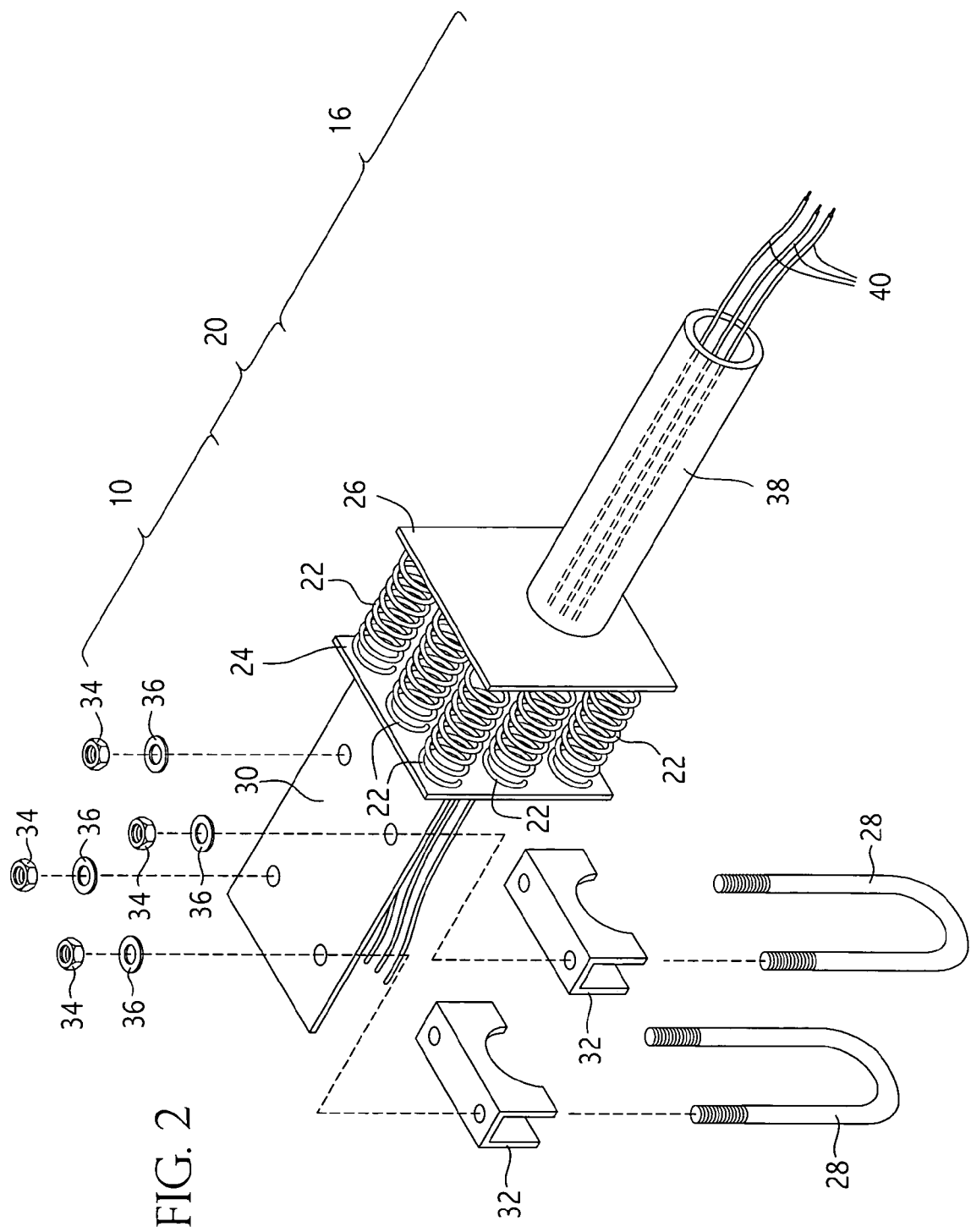
FIG. 2 is a perspective view of the of a preferred embodiment of the present invention in disassembled form.

FIG. 2 is an exploded illustration of the perspective view of the device, additionally showing wiring 40 for fixture 18.

It should be appreciated that, while specific embodiments are described hereinafter, several other applications of the presently described invention may be contemplated by those of skill in the art in view of this disclosure. Accordingly, the scope of this invention is not limited to the specific embodiments described in detail hereinafter. Rather, what is intended to be covered is as set forth in the ensuing claims and the equivalents thereof permitted as a matter of law.

That which is claimed is:

1. A device comprising:
   (a) a first component sized and configured for connection to a support structure at a light fixture receiving portion of the support structure,
   (b) a second component sized and configured for connection to a light fixture, and
   (c) a dampening component which connects the first component to the second component and which dampening component is configured to dampen the transfer of vibration from the support structure to the light fixture;
wherein the dampening device comprises a plurality of springs, wherein the first component comprises a first plate and wherein the second component comprises a second plate, the first plate and the second plate being connected together by the at least one spring, wherein the plurality of springs of the dampening device is disposed so as to coil along substantially parallel axes and the plates are oriented substantially perpendicular to the axes along which individual springs are coiled, and wherein the plurality of springs is sandwiched between the plates.

2. The device of claim 1 wherein the support structure comprises a light pole and wherein the first component is configured for detachable attachment to the light pole.

3. The device of claim 1 wherein the support structure comprises a light pole and the first component is bolted to the light pole.

4. The device of claim 3 wherein the support structure is bolted to the pole by use of at least one U-bolt.

5. A method of dampening vibration which method comprises:
   (a) attaching a first component to a support structure at a light fixture receiving portion of the support structure,
   (b) attaching a second component to a light fixture, and
   (c) disposing a dampening component between the first component and the second component so that vibration from the support structure is dampened along a plurality of non-parallel axes;
wherein the dampening device comprises a plurality of springs, wherein the first component comprises a plate and wherein the second component comprises a plate, wherein the plurality of springs of the dampening device is disposed so as to coil along substantially parallel axes, respectively, and the plates are oriented substantially perpendicular to the axes along which individual springs are coiled, and wherein the plurality of springs is sandwiched between the plates.

6. The device of claim 5 wherein the support structure comprises a pole and the first component is bolted to the pole.

7. The device of claim 6 wherein the support structure is bolted to the pole by use of at least one U-bolt.

8. A device comprising:
   (a) a first component sized and configured for connection to a support structure,
   (b) a second component sized and configured for connection to a light fixture, and
   (c) a dampening component which connects the first component to the second component and which dampening component is sized and configured to dampen vibration acceleration along a plurality of non-parallel axes;
wherein the dampening component comprises a plurality of springs, wherein the first component comprises a plate and wherein the second component comprises a plate, wherein the plurality of springs of the dampening component is disposed so as to coil along substantially parallel axes, wherein the plates are oriented substantially perpendicular to the axes along which individual springs are coiled, and wherein the plurality of springs is sandwiched between the plates.

9. The device of claim 8 wherein the support structure comprises a pole and the first component is bolted to the pole.

10. The device of claim 9 wherein the support structure is bolted to the pole by use of at least one U-bolt.

* * * * *